| United States Patent [19] | [11] Patent Number: 4,476,420 |
| Asakawa | [45] Date of Patent: Oct. 9, 1984 |

[54] CIRCUIT ARRANGEMENT FOR SYNTHESIZING A SINUSOIDAL POSITION SIGNAL HAVING A DESIRED PHASE AND HIGH-RESOLUTION POSITIONING SYSTEM MAKING USE OF THE CIRCUIT ARRANGEMENT

[75] Inventor: Teruo Asakawa, Nirasaki, Japan

[73] Assignee: Telmec Co., Ltd., Japan

[21] Appl. No.: 443,471

[22] Filed: Nov. 22, 1982

[30] Foreign Application Priority Data

Nov. 26, 1981 [JP] Japan ................................ 56-190389

[51] Int. Cl.$^3$ .............................................. G05B 1/01
[52] U.S. Cl. .............................. 318/608; 340/347 M
[58] Field of Search ............... 318/608, 607, 606, 603; 340/347 M

[56] References Cited

U.S. PATENT DOCUMENTS

| 3,588,710 | 6/1971 | Masters | 318/608 |
| 3,609,320 | 9/1971 | Tripp | 340/347 M |
| 4,004,205 | 1/1977 | Yamamoto et al. | 318/608 |
| 4,319,172 | 3/1982 | Sieradzki | 318/608 |
| 4,392,096 | 7/1983 | Grajewski et al. | 318/625 |
| 4,429,267 | 1/1984 | Veale | 318/603 X |

*Primary Examiner*—B. Dobeck
*Attorney, Agent, or Firm*—Price, Heneveld, Huizenga & Cooper

[57] ABSTRACT

Positioning of a movable body can be achieved at a high resolution by making use of two position signals generated by a position detector, whose magnitudes are sinusoidal functions having different phases of the position of the movable body. On the basis of the two sinusoidal position signals, two bi-level digital position signals having different phase from each other are derived, and digital control for movement of the movable body is effected by making use of these two bi-level digital position signals until the movable body is brought into the proximity of a desired position. Thereafter, control is switched from the digital control to analog control for movement of the movable body, in which a position signal whose manitude is a sinusoidal function of the position of the movable body and has a zero-cross point at the desired position is used as a reference position signal. This reference position signal can be synthesized from the two position signals generated by the position detector by means of a simple signal synthesizer circuit according to the present invention. The signal synthesizer circuit comprises two multiplier type digital-analog converters, each of which is applied with a digital input signal and an analog input signal such as, for example, the above-mentioned sinusoidal position signal generated by the position detector and generates an analog output signal that is product including an algebraic sign of the digital input signal and the analog input signal, and an adder having the respective analog output signals of the two multiplier type digital-analog converters applied to its input. By appropriately selecting the digital values of the digital input signals, a desired reference position signal can be derived at the output of the adder.

13 Claims, 3 Drawing Figures

CIRCUIT ARRANGEMENT FOR SYNTHESIZING A SINUSOIDAL POSITION SIGNAL HAVING A DESIRED PHASE AND HIGH-RESOLUTION POSITIONING SYSTEM MAKING USE OF THE CIRCUIT ARRANGEMENT

BACKGROUND OF THE INVENTION

The present invention relates to a signal synthesizer circuit for synthesizing a signal whose magnitude is a sinusodial function having any arbitrary phase of an independent variable from two signals whose magnitudes are sinusoidal functions having different phases from each other of the independent variable such as, for example, a sine function and a corresponding cosine function (a phase difference of 90°) of the independent variable, and a high-resolution positioning system making use of the signal synthesizer circuit.

Heretofore, in a manufacturing apparatus of semiconductor devices or in a industrial robot, a positioning operation has been effected to bring a loading table or an arm to a desired position. In such cases, in the positioning operation, open-loop control making use of a step-motor or the like and closed-loop control making use of a position detector and a D.C. motor have been employed in the prior art. However, as the required precision for positioning is enhanced, necessity of the closed-loop control is being increased.

As the position detector that is essentially necessitated for the closed-loop control, a magnetic scale, an optical encoder, a laser length meter, etc. have been known, and in the case of the magnetic scale, optical encoder or the like, normally a resolution of the order of about 1 micron can be obtained, while in the case of the laser length meter a resolution of the order of submicrons can be obtained. However, since the laser length meter is very expensive, it was difficult to provide a position detector having a resulution of the order of submicrons at a low cost and in a simple manner.

SUMMARY OF THE INVENTION

It is therefore one object of the present invention to provide a positioning system having a relating simple construction in which a high resolution of the order of submicrons can be attained even by making use of a less expensive position detector such as an optical linear scale or the like.

Another object of the present invention is to provide a positioning signal processor circuit in a positioning system for a manufacturing apparatus of semiconductor devices or for a robot, which enables to position a loading table or an arm at a high resolution while employing a conventional cheap position detector.

Still another object of the present invention is to provide a positioning system which can achieve positioning of a movable body at a high resolution that is finer than a pitch of position detection defined by a position detector for detecting the position of the movable body and that is independent of the pitch of position detection.

According to one feature of the present invention, there is provided a signal synthesizer circuit comprising two multiplier type digital-analog converters each of which is applied with a digital input signal and an analog input signal and generates an analog output signal that is a product including an algebreic sign of the digital input signal and the analog input signal, and an adder having the respective analog output signals of the two multiplier type digital-analog converters applied to its inputs.

According to another feature of the present invention, there if provided a positioning system for bringing a movable body precisely at a desired position, comprising a motor for driving the movable body, motor control means for controlling start/stop, a speed and a direction of movement of said motor, position detector means for generating at least two position signals whose magnitudes are sinusoidal functions having different phases from each other of the position of the movable body, a reference position signal synthesizer circuit consisting of two multiplier type digital-analoge converters having the two position signals generated by the position detector means applied respectively to one inputs thereof and digital parameters determined by the desired position applied respectively to the other inputs there of and adapted to issue at their outputs analog signals which are products including algebraic signs of the corresponding analog position signals and digital parameters and an adder for adding the respective output analog signals of the two multiplier type digital-analog converters to generate a reference position signal which has its zero-cross point exactly at the desired position, a digital position signal synthesizer circuit for synthesizing two bi-level digital position signals having different phases from each other and having a different frequency from the at least two sinusoidal position signals generated by the position detector means on the basis of the at least two sinusoidal position signals, a digital control circuit for controlling movement of the movable body by making use of the two bi-level digital position signals, an analog linear control circuit for controlling movement of the movable body by making use of the reference position signal, especially its linear portion near to its zero-cross point, and switching means connected to the motor control means for automatically switching the connection to the input of the motor control means from the digital control circuit to the analog linear control circuit when the position of the movable body has fallen in the position range corresponding to the linear portion of the reference position signal near to its zero-cross point.

The above-mentioned and other features and objects of the present invention will become more apparent by reference to the following description of a preferred embodiment of the invention taken in conjunction with the accompanying drawings.

DESCRIPTION OF THE PREFERRED EMBODIMENT

Figure 1:
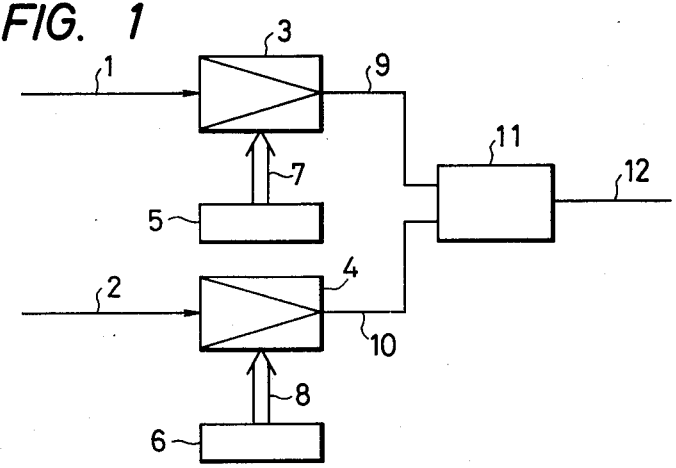
FIG. 1 is a block diagram of a reference position signal synthesizer circuit according to one preferred embodiment of the present invention.

Referring now to FIG. 1, reference numerals 3 and 4, respectively, designate multiplier type digital-analog converters (hereinafter abbreviated as multiplier type D/A converter), in each of which an analog output 9 or 10 derived by converting a corresponding digital input 7 or 8 as is the case with the conventional D/A converters is controlled by a corresponding second input 1 or 2 which is an analog quantity serving as a parameter, and an analog output 9 or 10 equal to a product including an algebrair sign of the first digital input 7 or 8 and the second analog input 1 or 2, respectively, is generated. In addition, reference numerals 5 and 6, respectively, designate registeres for holding the digital values of the first digital inputs 7 and 8, respectively. The outputs 9 and 10 of the multiplier type D/A converters 3 and 4, respectively, are added together by means of an adder amplifier 11 and an analog output 12 is issued from the added amplifier 11.

Assuming now that analog values S and C are applied as analog inputs 1 and 2, respectively, and digital values M and N are applied as digital inputs 7 and 8, respectively, then the analog value X of the output analog signal 12 of the signal synthesizer circuit shown in FIG. 1 is represented by the following formula:

$$X = M \cdot S + N \cdot C \qquad (1)$$

In practice, the analog values S and C are applied as voltages, the digital values M and N are constant values less than 1 stored in the registers 5 and 6, respectively, and the output analog value X is derived as a voltage from the output of the adder 11.

In the event that the analog values S and C applied to this circuit as input signals are represented as sinusoidal functions having different phases of an independed variable x, for instance, in the forms of $S = \sin x$ and $C = \cos x$, then substituting these functions for the analog quantities S and C in Equation (1) above, the output analog quantity X is represented by the following equations:

$$\left. \begin{array}{l} X = M \sin x + N \cos x \\ \\ = \sqrt{M^2 + N^2} \sin (x + \alpha) \\ \text{where } \tan \alpha = N/M \end{array} \right\} \qquad (2)$$

Therefore, by appropriately selecting the digital values M and N, a sinusoidal function of x having its phase advanced by any arbitrary phase angle $\alpha$ with respect to one of the input sinusoidal analog values $S = \sin x$, can be obtained as the output analog value X. In other words, a signal having an amplitude that is a sinusoidal function of an independent variable x having any arbitrary phase angle $\alpha$ as shown at 23 in FIG. 2 can be synthesized from two signals whose amplitudes are sinusoidal functions having different phase from each other of the independent variable x as shown at 21 and 22, respectively, in FIG. 2.

The basic operation of the signal synthesizer circuit according to the present invention as shown in FIG. 1 has been described above. In the following, description will be made on application of this signal synthesizer circuit to derivation of a reference position signal from two different sinusoidal position signals generated by a common position detector for the purpose of effecting positioning at a higher resolution than that attainable by the digital control for positioning in the prior art.

At first, description will be made on various processings for position signals generated by a position detector and a principle of application of various position signals derived through the signal processings to a positioning operation of a movable body by making use of a D.C. servo control circuit with reference to FIG. 2. With regard to a position detector to be used for a positioning operation, so long as it can provide at least two output signals whose amplitudes are sinusoidal function having different phases from each other of a position of a movable body as described above, any kinds of position detector could be employed. By way of example, an optical linear scale known in the prior art could be used, from which normally two-phase or four-phase signals having a wavelength of 8 to 20 microns are obtained. The four-phase output signals are normally derived by adding to two-phase output signals another set of output signals which are 180° out-of-phase with respect to the first-mentioned two-phase output signals generally for the purpose of cancelling an offset in an electrical circuit system, hence as a signal system the four-phase output signals can be deemed to be equivalent to the two-phase output signals, and therefore, the following explanation will be made in connection to the case of two-phase output signals.

Figure 2:
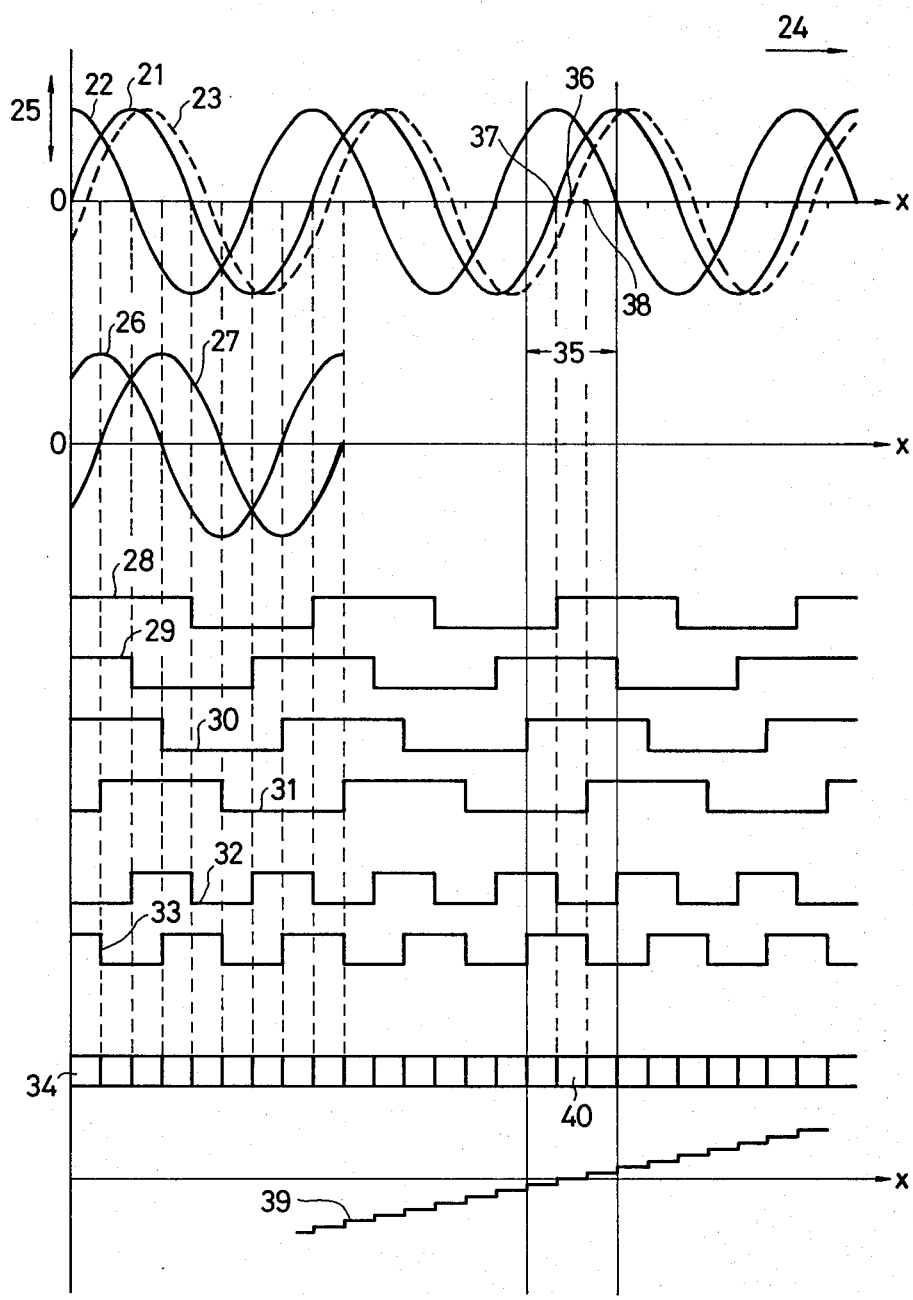
FIG. 2 is a waveform diagram showing various waveforms each defined as a function of a position of a movable body, which appear at various points in the reference position signal synthesizer circuit in FIG. 1 and in a high-resolution positioning system according to the present invention.

In FIG. 2, waveforms of various position signals are shown. It is to be noted that the direction of an arrow 24, that is, the abscissa is not a time axis but represents a direction of increase of a position coordinate of a movable body, and the direction of an arrow 25 represents a voltage as a function of the position coordinate.

At first, offsets and amplitudes of output signals from a position detector are adjusted so as to obtain signals 21 and 22 which have equal amplitudes in the positive and negative directions with respect to a zero volt level. In the illustrated example, the signal 22 is a cosine wave signal having the maximum positive amplitude at the zero coordinate position, and the signal 21 is a sine wave signal having a 90° retarded phase with respect to the signal 22. Although the amplitudes of the signals 21 and 22 are equalized in the illustrated example, it is possible to carry out subsequent signal processings as will be described below, starting from a sine wave signal and a cosine wave signal having different amplitude by adjusting the digital input values M and N in Equation (2).

Next, a sum signal 26 and a difference signal 27 of the signals 21 and 22 are synthesized. In the illustrated embodiment, the amplitudes of the sum signal 26 and the difference signal 27 are divided by $\sqrt{2}$ for the sake of convenience. Hence the amplitudes of the resultant sum signal 26 and the resultant difference signal 27 are equalized to the amplitude of the signals 21 and 22.

Subsequently, rectangular wave signals 28, 29, 30 and 31 corresponding in phase to the sinusoidal signals 21, 22, 26 and 27, respectively, are derived by emplifying the signals 21, 22, 26 and 27 with a high-gain amplifier and clipping both the positive and negative amplitudes. Then a rectangular wave signal 32 having its frequency doubled is derived by producing an exclusive logical sum of the signals 28 and 29, and a rectangular wave signal 33 having the same frequency as the signal 32 but being 90° out-of-phase with respect to the signal 32 is derived by producing an exclusive logical sum of the signals 30 and 31. By combining these two-phase rectangular wave signals 32 and 33 and one of the original four-phase rectangular wave signals 28, 29, 30 and 31, the magnitude of movement and the direction of movement of the movable body can be monitored at a resolution equal to ⅛ of the repetition cycle of the position detector.

Therefore, a position counter 34 is provided such that the count in the counter 34 may be changed by one at every level transition point of the signals 32 and 33 either in the count-up direction or in the count-down direction depending upon the direction of movement. This counter 34 is reset at the position of the movable body where a detection signal is issued from an origin detector provided separately, so that it can always hold the position of the movable body relative to the origin at a resolution of ⅛ of the repetition cycle of the position detector. In other words, if the repetition cycle of the position detector is 8 microns, the position counter 34 has a resolution of 1 micron. This counter 34 is called "present position counter" or "current position counter", to effect closed-loop control by making use of the count in this current position counter as a position signal is called "digital control", and the zone of movement of the movable body where digital control is effected is called "digital control zone". Since the resolution of the current position counter is ⅛ of the repetition cycle of the position detector, the resolution in control of the digital control is also equal to this resolution. As is well known, in order to achieve stable closed-loop control that is free from hunting, a speed signal is necessary, and in the case of the above-described digital control, a voltage signal obtained by subjecting the two-phase rectangular wave signals to frequency-voltage (F·V) conversion, can be employed as a digital speed signal of the movable body.

In the following, a principle of a positioning operation for a movable body by making use of the above-described various position signals will be explained.

At first, the positioning operation is started by the digital control, unless a current position and a desired position of the movable body are so close to each other that analog linear control as will be described later can be started immediately. It is assumed that a desired position for the positioning operation is the point denoted by reference numeral 36 in FIG. 2. At first, in order to obtain a position error signal necessitated in a servo control system, differences between the respective counts in the current position counter 34 and the count corresponding to the minimum distinguishable zone of the counter (having a width of ⅛ of the repetition cycle of the position detector: hereinafter called "unit zone") in which the desired position 36 is included, are calculated and subjected to digital-analog conversion, and thereby a step-like position error signal as shown at 39 in FIG. 2 is obtained. It is to be noted that this position error signal takes a zero level in the unit zone 40 including the desired position 36. By making use of this position error signal 39 jointly with the above-mentioned digital speed signal obtained by F-V conversion of the two-phase rectangular wave signals 32 and 33, a D.C. servo control circuit is constructed, and thereby conection of the position error is effected towards the unit zone 40.

However, since the position error signal 34 has only a resolution of ⅛ of the repetition cycle of the position detector in view of the process for deriving the position error signal 39 and presents only discrete values, the position error signal 39 is insensitive to variation of the position of the movable body within one unit zone 40.

Accordingly, once the movable body has been brought into the unit zone 40 including the desired position, the position correcting capability of the D.C. servo control system is lost, and so, the movable body would fluctuate within the unit zone 40 and cannot stop at the desired position 36. Therefore, a linear zone as will be described below is established and the servo control is switched from the above-mentioned digital control to analog linear control.

Now, a zone 35 of movement of the movable body consisting of the unit zone 40 including the desired position 36 and the adjacent two unit zones as shown in FIG. 35 is called "linear zone", because it is possible to derive a reference position signal 23 which changes approximately in a linear fashion within this zone 35 from the original two-phase sinusoidal position signals 21 and 22 and to achieve analog linear control for positioning on the basis of this reference position signal 23. As soon as the movable body has come in the linear zone 35 as a result of the above-mentioned digital control for positioning, the digital control is interrupted, and the control for positioning is switched to analog linear control as will be described in the following.

The linear control itself is a conventional process, in which either one of a monotonously increasing half cycle and a monotonously decreasing half cycle of a position signal simulated by a sinusoidal function of a position is employed as a position error signal and closed-loop control is effected to make the position error signal become zero. One example of this lenear control is found in a positioning system for a reading head of a magnetic disc memory device which employs an optical linear scale as a position detector and employs a voice coil as a driving source. Accordingly, in order to achieve positioning under this linear control, a position signal which is a sinusoidal function of a position having a zero-cross point at a desired position, is necessary.

However, in such type of positioning system, as sinusoidal position signals available for positioning, only the two-phase sinusoidal position signals issued from the position detector, the sum sugnal and the difference signal derived from the two-phase sinusoidal position signals and the signals obtained by inverting the polarities of these four sinusoidal position signals, that is, only eight kinds of signals consisting of the signals 21, 22, 26 and 27 and the signals obtained by inverting the polarities of these signals could be employed. Accordingly, even in the case where it is desired to stop the movable body at the position 36, it was only possible to stop it at a point 37 or at a point 38.

Such limitation to the number of available position error signals, that is, the limitation to the number of stoppable points was imposed by the method for producing the position error signals in the prior art. More particularly, according to the method employed in the prior art for producing a position error signal having a zero-cross point at a given position, in which the two-phase sinusoidal position signals generated by the position detector is multiplied by fixed constants, respectively, and then the two products are added together or subtracted one from the other, one operational amplifier and a group of resistors associated with the operational amplifier were necessitated. However, once an electrical circuit arrangement in a positioning system has been completed, it was impossible to add an operational amplifier and an associated resistor group, and so, it was impossible to produce a sinusoidal position error signal having a zero-cross point at a desire position each time it is desired.

In order to stop a movable body at a disired position 36 through the linear control, a sinusoidal position error signal taking a zero level at the desired position 36 as shown by a dash-line curve 23 in FIG. 2 becomes necessary. According to the present invention, a sinusoidal position error signal 23 which takes a zero level substantially at the desired position 36 for positioning, can be synthesized by making use of the proposed signal synthesizer circuit shown in FIG. 1, applying the two-phase sinusoidal position signals 21 and 22 to its two analog inputs 1 and, respectively, and appropriately adjusting the digital values M and N appearing in Equation (2) and applied to its two digital inputs 7 and 8, respectively. The fine adustment capability for the stop position of the movable body, especially the upper limit of precision of the positioning operation is determined by the number of bits of the digital inputs 7 and 8 to the multiplier type digital-analog converters 3 and 4 used in the signal synthesizer circuit shown in FIG. 1. Therefore, so long as a sufficient number of bits are included in the respective digital inputs 7 and 8, the synthesized sinusoidal position error signal 23 can be deemed to cross the zero level line substantially at the desired position 36. By constructing a D.C. servo control system which employs the thus obtained sinusoidal position error signal 23 and a speed signal obtained by passing this position error signal 23 through a differentiating circuit, positioning of a movable body can be achieved with a less number of circuit parts at a higher resolution than the positioning system in the prior art. For instance, in the case where a position detector having a repetition cycle of 8 microns is used, the positioning can be achieved at a resolution of about 0.1 microns.

Figure 3:
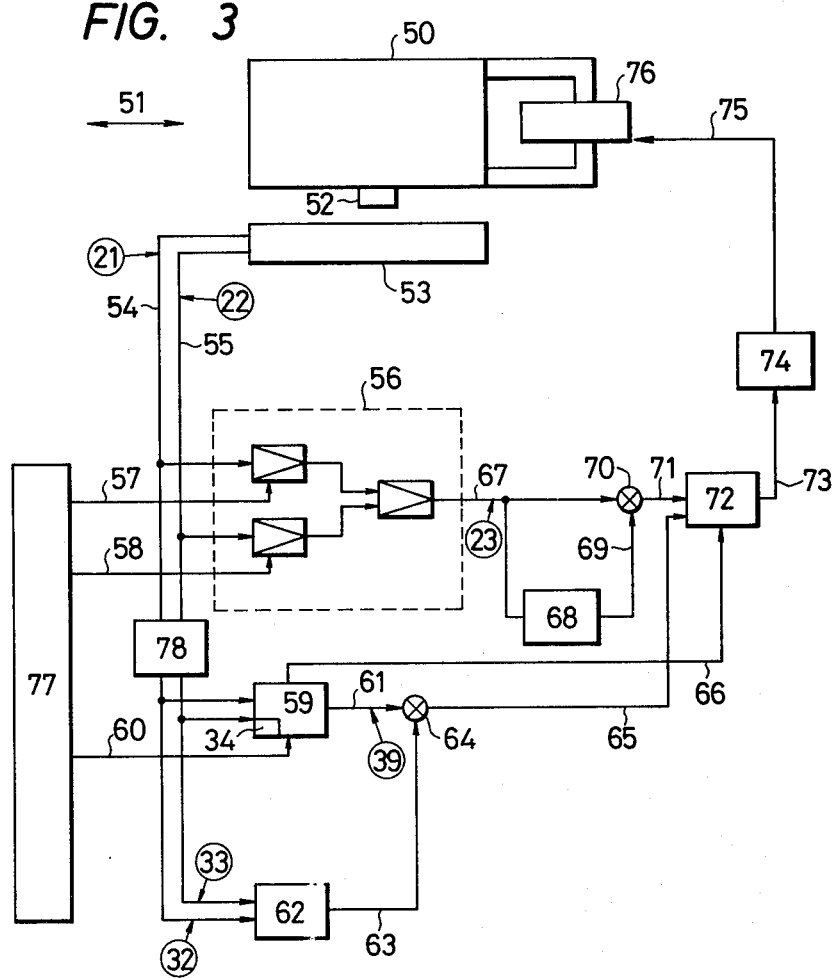
FIG. 3 is a block diagram of a high-resolution positioning system according to one preferred embodiment of the present invention, which includes the reference position signal synthesizer circuit in FIG. 1 as its essential part.

Now, description will be made on one example of a practical servo control system embodying the present invention with reference to FIG. 3. As noted previously, for a positioning operation employing closed-loop control, always a position detector is necessitated. In the illustrated example, an optical linear scale having a repetition cycle of 8 microns is used as a position detector, and positioning of a loading table in a munufacturing apparatus of semiconductor devices is a achieved at a resolution of about 0.1 microns. FIG. 3 shown a positioning system with respect to movement of the loading table in the directions along one axis for the sake of convenience.

Referring now to FIG. 3, reference numeral 30 designates a loading table, which can be smoothly moved only in the directions indicated by arrows 51. Reference numerals 52 and 53 jointly designate an optical linear scale serving as a position detector for the loading table 30, numeral 52 denoting a moving part thereof, and numeral 53 denotes a fixed part forming a signal generator. Reference numeral 76 designates a drive source, for which a moving-coil type linear motor is used in the illustrated embodiment. However, regardless of the type of the drive source, any drive source could be employed so long as it is a current-force converter as is generally used in a D.C. servo control system.

Reference numerals 54 and 55 designate output signal lines extending from the fixed part 53 of the optical linear scale 52/53, and on these output signal lines 54 and 55 are supported the two-phase sinusoidal position signals 21 and 22, respectively, in FIG. 2. In the illustrated example, the position signal 21 is a sine function of the position coordinate x as measured from the origin, while the position signal 22 is a cosine function of the position coordinate x, and so, these two sinusoidal position signals 21 and 22 have a phase difference of 90°. In the illustrated example it is assumed that the repetition cycle of these sinusoidal position signals 21 and 22 is equal to 8 microns. However, so long as the output position signals can be approximated by a sine wave signal and a cosine wave signal, respectively, after their waveforms have been shaped by adjusting amplitudes and eliminating offsets, any arbitrary sinusoidal position signals could be employed regardless of there repetition cycle, amplitude and offset. The above-mentioned is the mechanical structure of the positioning system.

Now, a linear control system will be explained. In FIG. 3, reference numeral 56 designates a novel signal synthesizer circuit according to the present invention, whose construction and operation have been already described with reference to FIG. 1. Reference numerals 57 and 58 designate digital input lines leading from a desired position data calculator circuit 77 to the digital inputs of the two multiplier type digital-analog converters in the signal synthesizer circuit 56. Once position data for the desired stop position 36 are input to the desired position date calculator circuit 77, the calculator circuit 77, the calculator circuit 77 calculates the digital values M and N in Equation (2) which are necessitated for synthesizing the reference position error signal 23 having a zero-cross point at the position 36 from the two basic position signals 21 and 22, and applies the calculated digital values M and N to the signal synthesizer circuit 56 via the digital input lines 57 and 58. Reference numeral 67 designates an output signal line of the signal synthesizer circuit 56, and the reference position error signal 23 to be used in the linear control is supported on this output signal line 67. Reference numeral 68 designates a differentiating circuit, and so, a speed signal to be used in the linear control appears on a signal line 69. The position error signal 23 on the line 67 and the speed signal on the line 69 are added together by an analog adder 70, and the sum signal is applied via a signal line 71 to a switching circuit 72. The above-mentioned is a linear control system.

On the other hand, a digital control system is constructed of a digital position processor circuit 59, a digital speed detector circuit 62 consisting of an F-V converter and an analog adder 64. Between the output of the optical linear scale 52/53 and the inputs of the digital position processor circuit 59 and digital position detector 62 is interposed another signal processor circuit 78, in which starting from the basic sinusoidal position signals 21 and 22, various position signals 26, 27, 28, 29, 30, 31, 32 and 33 in FIG. 2 are derived through the procedures described previously with reference to FIG. 2. Hence, the signal processor circuit 78 includes high-gain amplifiers, clippers and various logic elements. Therefore, the signals 32 and 33 are input to the digital position processor circuit 59 and to the digital position detector 62. The current position counter 34 is included in the digital position processor circuit 59. The operations of generating stepping pulses from the two-phase position signals 32 and 33, stepping the current position counter 34 with the stepping pulses, and deriving the step-like digital position error signal 39 (FIG. 2) from the count in the current position counter 34 and the position data for the desired position 36 which is fed from the desired position data calculator circuit 77 via a signal line 60, are carried out in the digital position processor circuit 59. The step-like digital position error signal 39 on an output signal line 61 and a digital speed signal on an output line 63 of the digital speed detector circuit 62 are added together by the analog adder 64, and the sum signal to be used in the digital control is applied via a signal line 65 to the switching circuit 72.

In addition, the digital position processor circuit 59 has the function of comparing the desired position data fed from the calculator circuit 77 with the count in the current position counter 34 and issuing a detection signal on a signal line 66 when the count has entered the linear zone 35 about the desired position 36. The detection signal indicating that the current position of the movable body entered the linear zone 35 is applied via the signal line 66 to the switching circuit 72. When the signal on the signal line 66 is not present, that is, when the movable body is located outside of the linear zone 35, the switching circuit 72 selects the digital control signal on the signal line 65 and applies it via a signal line 73 to a drive control circuit 74 for the drive source or linear motor 76. Whereas, when the signal on the signal line is present, that is, when the movable body is located within the linear zone 35, the switching circuit 72 selects the analog linear control signal on the signal line 71 and applies it via the signal line 73 to the drive control circuit 74. The drive control circuit 74 feeds a drive current to the linear motor 76 via a power line 75 depending upon a control signal applied thereto, whether it may be a digital control signal or an analog linear control signal.

In summary, once position data for the desired position 36 where the loading table 50 is to be stopped are set in the illustrated positioning system, the desired position data calculator circuit 77 calculates the digital values M and N in Equation (2) which are necessary to synthesize the reference position error signal 23 taking a zero level at the position 36 and the discrete position data corresponding to the unit zone 40 (FIG. 2) including the position 36, and applies the former to the signal synthesizer circuit 56 and the latter to the digital position processor circuit 59. Now, both the digital control system including the items 34, 59, 61, 62, 63, 64 and 65 and the analog linear control system including the items 56, 67, 68, 70 and 71 are ready to achieve the respective closed-loop controls. In general, the loading table 50 is initially outside of the linear zone 35 with respect to the desired position 36. Therefore, normally control for the positioning operation is started by the digital control, and when the loading table 50 has come in the linear zone 35, the switching curcuit 72 switches the mode of control from the digital control to the analog linear control. In this way, the loading table can be brought to the desired position at a high resolution. In the illustrated embodiment, since the optical linear scale 52/53 has a repetition cycle of 8 microns, if the digital control only is employed, the resolution in positioning is as low as 1 micron. However, owing to the subsequent linear control, the resolution in positioning can be raised up to the order of 0.1 microns, despite of the use of the signal synthesizer 56 having a very simple construction.

In order to facilitate understanding of the above-described operation of the positioning system according to the present invention, the reference numerals of some position signals shown in FIG. 2, are indicated in FIG. 3 as encircled together with arrows indicating the signal lines on which the position signals are present.

Since many changes could be made in the above-construction and many apparently widely different embodiments of the invention could be made without departing from the scope thereof, it is intended that all matter contained in the above description or shown in the accompanying drawings shall be interpreted as illustrative and not as a limitation to the scope of the invention.

What is claimed is:

1. A signal synthesizer circuit comprising two multiplier type digital-analog converters, each of which is applied with a digital input signal and an analog input signal and generates an analog output signal that is a product including an algebraic sign of said digital input signal and said analog input signal, and an adder having the respective analog output signals of said two multiplier type digital-analog converters applied to its inputs.

2. A signal synthesizer circuit as claimed in claim 1, in which said analog input signals applied to said respective multiplier type digital-analog converters have values which are sinusoidal functions having different phases from each other of an independent variable, said digital input signal applied to said respective multiplier type digital-analog converters have fixed values which can be arbitrarily chosen, and thereby said analog output signal has a value which is a sinusoidal function having a different phase from the respective analog input signals of said independent variable.

3. A signal synthesizer circuit for synthesizing a reference position signal having a value that is a sinusoidal function of a position parameter and having a zero-cross point at a desired position from two different position signals having values which are sinudoidal functions having different phases from each other of the position parameter as claimed claim 1, in which said two different position signals are applied respectively to said respective multiplier type digital-analog converters as said analog input signals, hence the analog output signal of said adder also have a value that is a sinusoidal function of said position parameter, and the amplitude and the phase or zero-cross point of said analog output signal of said adder can be arbitrarily varied by appropriately selecting the digital values of said digital input signals to said respective multiplier type digital analog converters, whereby said reference position signal can be synthesized at the output of said adder.

4. A signal synthesizer circuit as claimed in claim 3, in which said two different position signals are two different output signals of a position detector for a movable body.

5. A positioning system for bringing a movable body precisely at a desired position; compriging a motor for driving said movable body; motor control means for controlling start/stop, a speed and a direction of movement of said motor; position detector means for generating at least two position signals whose magnitudes are sinusoidal functions having different phases from each other of the position of said movable body: a reference position signal synthesizer circuit, consisting of two multiplier type digital-analog converters having said two position signals generated by said position detector means applied respectively to one inputs thereof and digital parameters determined by said desired position applied respectively to the other inputs thereof and adapted to issue at their outputs analog signals which are products including algebraic signs of the corresponding analog position signals and digital parameters, and an adder for adding said respective output analog signals of said two multiplier type digital-analog converters to generate a reference position signal which has its zero-cross point exactly at said desired position; a digital position signal synthesizer circuit for synthesizing two bi-level digital position signals having different phases from each other and having a different frequency from said at least two sinusoidal position signals generated by said position detector means, on the basis of said at least two sinusoidal position signals; a digital control circuit for controlling movement of said movable body by making use of said tow bi-level digital position signals; an analog linear control circuit for controlling movement of said movable body by making use of said reference position signal, especially its linear portion near to its zero-cross point; and switching means connected to said motor control means for automatically switching the connection to the input of said motor control means from said digital control circuit to said analog linear control circuit when the position of said movable body has fallen in the position range corresponding to said linear portion of said reference position signal near to its zero-cross point.

6. A positioning system as claimed in claim 5, in which said analog linear control circuit includes a differentiating circuit having said reference position signal applied to is input for deriving a speed signal therefrom at its output and adder means for producing a sum of said position signal and said speed signal to be applied to said motor control means via said switching means.

7. A positioning system as claimed in claim 5, in which said digital control circuit includes a frequency-voltage converter circuit having said two bi-level digital position signals applied to its inputs for deriving a digital speed signal therefrom at its output, a digital position processor circuit having said bi-level digital position signals applied to its input for deriving a multi-level digital position signal which takes a zero level in the proximity of said desired position therefrom at its output, and adder means for producing a sum of said multilevel digital position signal and said digital speed signal to be applied to said motor control means via said switching means.

8. A positioning system as claimed in claim 5, in which said movable body is a loading table for a workpiece.

9. A positioning system as claimed in claim 5, in which said movable body is a movable arm.

10. A positioning system as claimed in claim 6 in which said movable body is a loading table for a workpiece.

11. A positioning system as claimed in claim 7 in which said movable body is a loading table for a workpiece.

12. A positioning system as claimed in claim 6 in which said movable body is a movable arm.

13. A positioning system as claimed in claim 7 in which said movable body is a movable arm.

* * * * *